US008381971B2

(12) United States Patent
Lambert et al.

(10) Patent No.: US 8,381,971 B2
(45) Date of Patent: Feb. 26, 2013

(54) SYSTEM AND METHOD FOR POINT OF SALE CASH REBATES

(75) Inventors: Gregory W. Lambert, Richmond, VA (US); Alice K. Wheeler, Glen Allen, VA (US); Charles A. Rosenblatt, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 187 days.

(21) Appl. No.: 11/173,063

(22) Filed: Jun. 30, 2005

(65) Prior Publication Data

US 2007/0000996 A1      Jan. 4, 2007

(51) Int. Cl.
*G06K 5/00* (2006.01)
(52) U.S. Cl. ........................................ 235/380; 235/381
(58) Field of Classification Search .................... 705/14; 235/380, 381, 375, 383
See application file for complete search history.

(56) References Cited

U.S. PATENT DOCUMENTS

| | | | |
|---|---|---|---|
| 5,256,863 A | 10/1993 | Ferguson et al. | 235/383 |
| RE36,116 E | 2/1999 | McCarthy | 705/16 |
| 5,924,080 A | 7/1999 | Johnson | 705/26 |
| 6,354,492 B1 * | 3/2002 | Powell et al. | 235/380 |
| 6,450,407 B1 | 9/2002 | Freeman et al. | 235/492 |
| 6,663,002 B2 * | 12/2003 | Glaser | 705/36 R |
| 6,748,365 B1 | 6/2004 | Quinlan et al. | 705/14 |
| 2002/0152118 A1 | 10/2002 | Hadjigeorgis | 705/14 |
| 2003/0009393 A1 | 1/2003 | Norris | 705/27 |
| 2003/0055727 A1 | 3/2003 | Walker et al. | 705/14 |
| 2003/0083930 A1 | 5/2003 | Burke | 705/14 |
| 2004/0039637 A1 | 2/2004 | Kopf et al. | 705/14 |
| 2004/0059634 A1 * | 3/2004 | Tami et al. | 705/17 |
| 2004/0251305 A1 * | 12/2004 | Klapka et al. | 235/383 |
| 2006/0122922 A1 * | 6/2006 | Lowenthal | 705/35 |
| 2008/0162280 A1 * | 7/2008 | Jacobs et al. | 705/14 |

FOREIGN PATENT DOCUMENTS

WO    WO 2004/019292    3/2004

* cited by examiner

*Primary Examiner* — Daniel St.Cyr
(74) *Attorney, Agent, or Firm* — Hunton & Williams LLP

(57) ABSTRACT

According to certain embodiments of the present invention, systems and methods are provided for providing a consumer with a rebate on purchases, which are made, for example, at a merchant. The rebate may be in a variety of forms. According to one aspect the rebate may be a reduction in the purchase price associated with a transaction. According to another aspect the rebate may be in the form of cash or an item having value being delivered to the consumer. The rebate may be provided at the Point of Sale. The rebate may be determined by a number of different criteria including purchase price, transaction frequency, predetermined time intervals, consumer loyalty, Point of Sale location, or any combination of these and other criteria.

15 Claims, 2 Drawing Sheets

SYSTEM AND METHOD FOR POINT OF SALE CASH REBATES

CROSS-REFERENCE TO RELATED APPLICATION

The present application contains material in common with co-pending U.S. Application Ser. No. 11/173,651, filed Jun. 30, 2005, titled ENHANCED SYSTEM AND METHOD FOR POINT OF SALE CASH REBATES, which is hereby incorporated by reference.

TECHNICAL FIELD

This invention relates in general to electronic financial transactions and, more particularly, to systems and methods for providing a consumer with a point-of-sale rebate on purchases made by the consumer.

BACKGROUND

It is common for consumers to make purchases using a card, which is linked to a financial account. The card may be any of a variety of types including debit, credit, or stored-value cards. The accounts may similarly be of a variety of types including checking, savings, or credit accounts. The card may be scanned, swiped, or otherwise process at the location at which the purchase transaction is being conducted. This location is sometimes referred to as the Point of Sale ("POS"). A POS device, such as an electronic card reader, may be used to scan the card, thus reading electronic information stored on a magnetic strip on the card. The electronic card reader may be coupled, via a telecommunications system to one or more computers located at the purchase site and/or at remote sites, such as banks and card issuers. The electronic information is used by the various computers to process the transaction and electronically transfer funds from one account to another, such as from the consumer's credit account to the merchant's bank account, in order to complete the transaction.

Some credit card accounts have associate rewards systems. For example, it is common for a credit card company or issuer to provide points or miles as rewards for a consumer who uses the company's card to make purchases. Some credit card companies provide a credit to the consumer at the end of each year. The credit amount is determined as a percentage (e.g., 2%) of the total value of the purchases that the consumer made with the card during the prior year. The amount is credited to the consumer's credit card account. When the consumer then makes additional purchases, the amount due in the next billing cycle is reduced by the credited amount.

SUMMARY

In accordance with the present invention, systems and methods are provided for giving a consumer a point-of-sale rebate on purchases made by the consumer.

Various embodiments of the present invention may benefit from numerous advantages. It should be noted that one or more embodiments may benefit from some, none, or all of the advantages discussed below.

One advantage of the invention is that a consumer is instantly provided with a rebate at the time of a purchase. Another advantage is that a consumer is provided cash in hand, or some other item having value, at a Point of Sale. These events can generate an increased sense of satisfaction on the part of the consumer. For example, the consumer might not have to wait until the end of a lengthy period in order to receive a rebate. Also, the consumer may experience an increased level of satisfaction by visualizing and/or physically receiving the rebate. Increased satisfaction on the part of the consumer may generate increased consumer loyalty associated with a merchant, bank, or card issuer. In general certain embodiments of the present invention increase the positive impact associated with providing a rebate to a consumer.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

In general, certain embodiments of the present invention are directed to systems and methods for providing a consumer with a cash rebate.

A consumer may wish to make a purchase at a merchant's store by using a credit card. The store may have a system that enables the transaction. As an example of the way such systems might work, a consumer might be at a clothing store. The consumer takes the items he or she wishes to purchase to a counter to check out. At the counter there may be a cash register and a Point-of-Sale ("POS") scanning device, which may also be referred to as a POS card reader. The cashier takes each clothing item and passes an associated price tag (e.g., having a bar code) across a bar code scanning platform. This causes an indication of the price for the various items to be stored in memory device associated with the cash register. The values are totaled and displayed on a register display. The consumer may pay by cash or by card. If the consumer wishes to pay by card, he or she might swipe their card in a slot in the card reader. A scanner in the card reader detects certain information embedded in a magnetic strip on the card. The information may include an account number associated with a financial account, such as a credit account. The information may be transmitted to a bank which manages an account for the merchant. The merchant may transmit the information, including the consumer's account number and transaction amount, via a communications network established by the credit card company, to a system managed by a bank which issued the credit card. The issuer's system then analyzes the information received and information associated with the consumer's credit account to determine whether the transaction is approved. If the transaction is approved, an appropriate electronic message is transmitted back to the merchant. The merchant then executes the transaction and funds are electronically transferred from the consumer's credit account to the merchant's bank account.

Certain embodiments of the present invention are directed to providing a rebate to the consumer based on purchases made by the consumer. The rebate may be in the form of a credit to the consumer's account. The rebate may be in the form of cash or some item having value given to the consumer at the point of sale. The rebate may be in the form of a reduction in the amount due at the point of sale. The rebate may be provided immediately at the time of the transaction. The rebate may be determined at various times and based on a variety of criteria.

Figure 1:
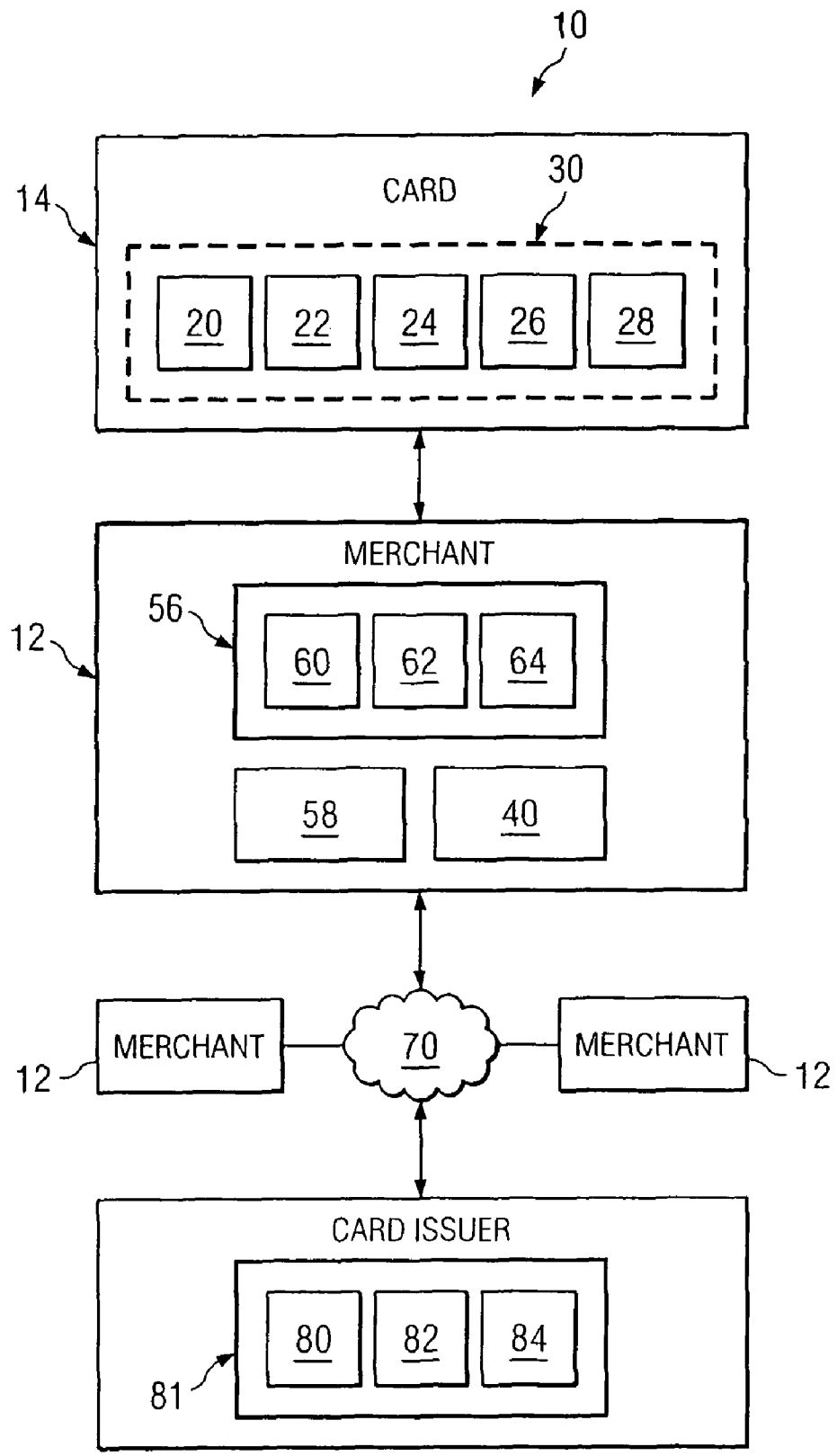
FIG. 1 illustrates an example system for providing a consumer with a rebate in accordance with an embodiment of the invention.
Figure 2:
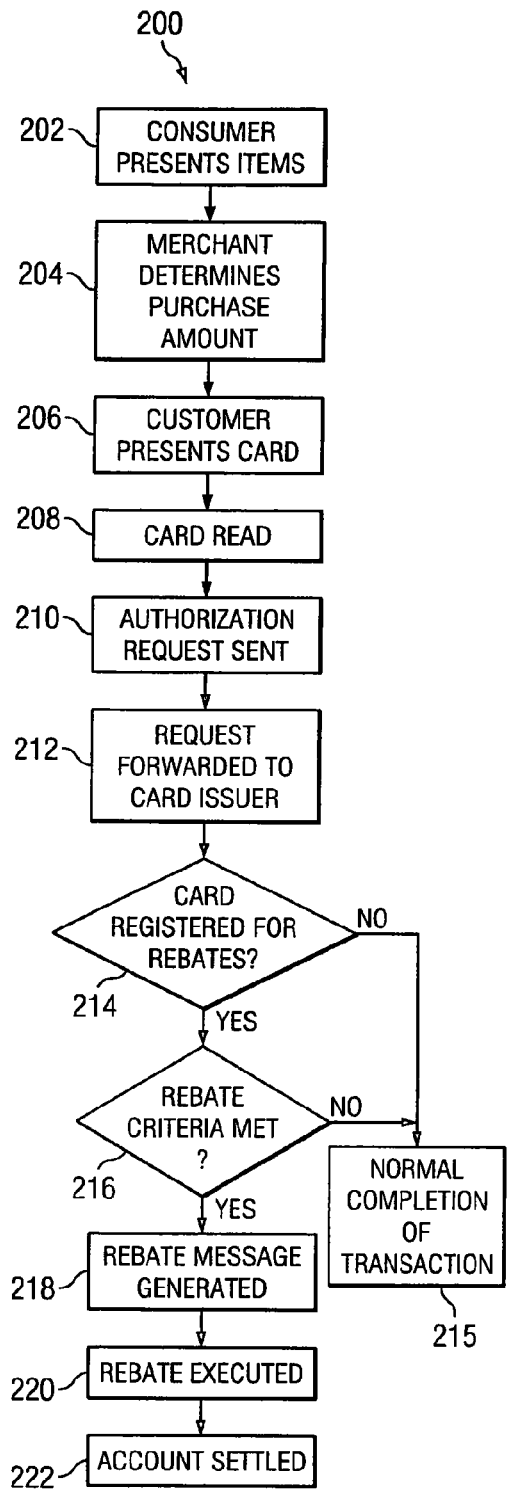
FIG. 2 illustrates a method for providing a consumer with a rebate in accordance with an embodiment of the present invention.
Figure 3:
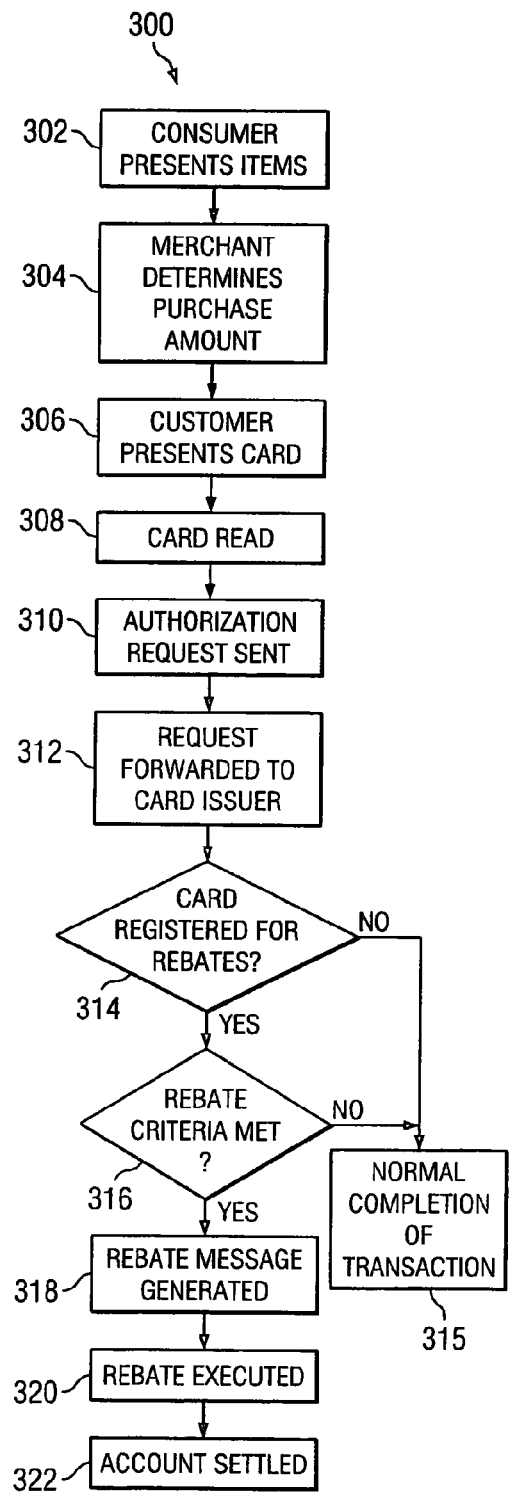
FIG. 3 illustrates a method for providing a consumer with a rebate in accordance with an embodiment of the present invention.

Example embodiments of the present invention and their advantages are best understood by referring now to FIGS. 1-3 of the drawings, in which like numerals refer to like parts. FIG. 1 illustrates an example system 10 for providing a point-of-sale rebate to a consumer in accordance with an embodiment of the invention. System 10 may include a merchant 12 and a monetary cards 14.

Merchant 12 may include any type of facility or entity operable to conduct transactions. The transactions may be any financial transactions including, for example, transactions involving the purchase of goods or services. Merchant 12 may be manifested in any form including brick-and-mortar stores, virtual stores, kiosks, service entities, etc.

Monetary card 14 can include any type of card that can be used to make purchases such as, without limitation, a debit card, a credit card, and a stored-value card. Card 14 may have one or more memory devices 30 provided on the card 14 that can store various data, such as a monetary value 20, a customer identification code 22, a card identification code 24, an expiration date 26, and/or an account number 28. Other types of information may be included on the card 14.

Preferably, the information is in the form of electronic data embedded in a magnetic strip (not expressly shown). As used herein, the phrase "provided on card 14" with reference to memory devices 30 or other devices (e.g., a processor) describes any physical coupling of such devices to a card 14, such as the device being provided on a surface of the card 14, located at least partially within the card 14, or otherwise physically coupled to the card 14.

The customer identification code 22 stored on a card 14 may provide security to prevent the card 14 from being used by unauthorized persons. For example, in some embodiments, in order to make purchases using the card 14, a customer (e.g. the card holder) must provide a code matching the customer identification code 22 stored on the card, such as by verbally communicating the code to a cashier or other personnel associated with the relevant merchant 12 or by entering the code into a customer interface, such as a card interface device 40, for example. In some embodiments, the customer identification code 22 is similar to a PIN or other security code, and may be selected by the purchaser or owner of the card 14, or by the merchant 12. Each customer identification code 22 may include any number, combination and/or configuration of numbers, letters, symbols, characters, or any other data that may allow that customer identification code 22 to be identified and/or distinguished from other customer identification codes 22. The customer identification code 22 may be stored in a memory device 30 provided on the card 14, which may or may not be the same memory device 30 that stores the monetary value 20, card identification code 24 and/or expiration data 26 of the card 14.

The card identification code 24 stored on a card 14 may be used to identify the card 14 from other cards 14. In some embodiments, each card 14 has a unique identification code 24. Card identification code 24 may be stored in a memory device 30 on card 14, which may or may not be the same memory device or devices 30 that store the monetary value 20, customer identification code 22 and/or expiration date 26 on the card 14.

The expiration date 26 stored on a card 14 may indicate a date and/or time that the card 14 may expire, may also be stored in a memory device 30 on card 14, which may or may not be the same memory device or devices 30 that store the monetary value 20, customer identification code 22 and/or card identification code 24 on the card 14.

The account number 28 may be indicative of the particular consumer financial account associated with the card 14. This may be a bank account number, such as a checking or savings account number. Alternatively, the account number may be a credit card account number. Other account numbers are envisioned as falling within the scope and spirit of the invention. The account number 28 may be identical to the consumer account number. Optionally, account number 28 may be a code that is different from, but indicative of, the consumer account number. In such a case, the account number 28 may be associated with the consumer account number, which may be stored, for example, in a database (not shown) maintained by a bank or a card issuer.

The monetary value 20, customer identification code 22, card identification code 24, expiration date 26, and/or account number 28 may be stored in the same memory device 30, in separate memory devices 30 of the same type, or in separate memory devices 30 of different types. Memory device(s) 30 on a card may include any device or devices suitable to store data, such as one or more magnetic strips, transistors, RFID devices, and/or memory chips, such as random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or flash memory, for example. Other electronic devices may also be stored on card 14, such as a processor operable to process various data stored in memory device(s) 30, for example.

In an example embodiment, to make a purchase using the card 14, the cardholder presents the card 14 to a card interface device 40 provided by merchant 12. Card interface 40 may include any device or devices for reading information from and/or writing information to cards 14. For example, card interface 40 may be a scanner, card reader, credit card authorization interface, a smart card reader, a debit card reader, or a stored value card reader, for example. Card interface device 40 may be operable to read data from and/or write data to one or more types of memory devices 30 provided on cards 14. Card interface device 40 may interface with such memory devices 30 provided on cards 14 via physical contact or otherwise, such as via radio or electromagnetic waves, for example. Preferably, card interface device 40 is a Point-of-Sale ("POS") device. In other words, card interface device 40 is preferably located at the Point of Sale. For example, the POS device may be located adjacent an electronic cash register on the check out counter at the merchant location.

Card interface device 40 may read the current monetary value 20, customer identification code 22, card identification code 24, expiration data 26, and/or account number 28 from memory device(s) 30 on card 14. The cardholder may then provide (or attempt to provide) a code matching the customer identification code 22, such as by speaking the code to the cashier or other personnel associated with the merchant 12 or by manually (e.g. by typing or keying) or otherwise entering the code into a customer interface, such as a card interface device 40, for example. The merchant 12 may then compare the customer identification code 22 read from the card 14 with the code provided by the cardholder. This comparison may be performed or at least facilitated by any suitable computerized system, such as card interface device 40 or any other computer system associated with or available to merchant 12. Alternatively, the cashier or other personnel associated with the merchant 12 may manually compare the customer identification code 22 read from the card 14 with the code provided by the cardholder. If the customer has provided the correct code, and if the current monetary value 20 read from the card 14, or the funds associated with the account number 28, are sufficient for the purchase, merchant 12 may execute the purchase.

Merchant 12 may include a merchant data management system 56 that manages information associate with conducting electronic transactions. System 56 may include one or more processors 60, memories 62, and network interfaces 64. Merchant 12 may also include, as discussed, one or more card interface devices 40 and one or more operator terminals 58. These various components may be located at one or more sites and may be coupled to each other using one or more links, each of which may include, for example, some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding.

An operator terminal 58 may provide an operator, such as a cashier, manager, other employee, or other individual associated with merchant 12, with access to data management system 56 to obtain information from, exchange information with, manage, configure, or otherwise interact with data management system 56. Operator terminal 58 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. For example, operator terminal 58 may be an electronic cash register. Operator terminal 58 may include or be partially or completely integrated with card interface device 40 and/or data management system 56. For example, an operator terminal 58 may be a combined cash register and card interface device 40 that includes data management system 56. Optionally, card interface device may be a device that is separate from, but electronically coupled to, operator terminal 58.

The components of data management system 56 may be supported by one or more computer systems at one or more sites. One or more components of data management system 56 may be separate from other components of data management system 56, and one or more suitable components of data management system 56 may, where appropriate, be incorporated into one or more other suitable components of data management system 56.

Processor 60 may process data associated with card 14, which may include executing software or coded instructions. Memory 62 may be coupled to processor 60 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Data management system 56 may be operable to manage transactions (or attempted transactions) made using a card 14. For example, system 56 may be operable to receive a card 14 from a customer attempting to make a purchase, read the customer identification code 24 from the appropriate memory device 30 on the card 14, receive a code from the customer 14 (such as verbally or via a customer interface, such as card interface device 40, for example), determine whether the code received from the customer matches the customer identification code 24, and if the code received from the first customer matches the customer identification code, reduce the monetary value 20 stored by in the memory device 30 by an amount associated with the purchase.

System 56 is preferably coupled to a consumer account data management system 81, via a telecommunications network 70. The merchant system may be coupled to network 70 via network interface 64 or by some other interface. Similarly, system 81 may be coupled to network 70 by a network interface 84. Any suitable components may be used to provide communication as necessary between the aforementioned components and it is to be understood that the various embodiments of the present invention are not necessarily limited to the configuration illustrated in FIG. 1.

In addition to interface 84, system 81 preferably includes one or more processors 80 and one or more memories 82. Memory 82 may be any suitable memory including, without limitation, those types of memory devices already discussed. Preferably, memory 82 is operable store data associated with one or more consumer accounts. Such information may include, for example, consumer identification numbers, account numbers, and transaction codes. For a given account, the information may include such information as account balances, credit limits, amounts due, payment due dates, hold information, security information, or any other type of information that may be associated with a consumer financial account.

The transaction code information may include electronic codes, which indicate a variety of transaction instructions. These may include, for example, approval codes, rejection codes, or special action codes. For example, an approval code may indicate that, based on the data associate with the respective consumer account, a transaction involving that particular consumer should be approved by the merchant. A rejection code, for example, may indicate to the merchant that the transaction should be rejected. This might be the case, for example, if there are insufficient funds in, or credit on, the consumer account. A special action code may be any other type of code such as a code associated with a security message. For example, such a code may be indicative of an instruction for the merchant to confiscate the card 14.

According to certain embodiments, as described in greater detail below, a transaction code may be indicative of any action associated with providing a rebate to the consumer. Thus, for example, a transaction code may be indicative of a message to the merchant that the merchant should reduce the purchase amount of a pending transaction by a certain amount or percentage, or that the merchant should provide the consumer with cash or some item having value. The various types of rebates are described in greater detail below.

Preferably, the transaction codes are used by system 81 to send messages to the Point of Sale. That is, activation of a particular transaction code generates a message at merchant 12. The message may be displayed, for example, on a display device associated with the operator terminal 58 or the card interface device 40.

FIGS. 2 and 3 illustrate, respectively, methods 200 and 300 of providing a consumer with a rebate according to embodiments of the invention. Although these figures illustrate certain steps in a certain order, it should be understood that the present inventions is not so limited. Thus, certain steps may be rearranged or eliminated. Additional steps, which are not expressly shown, may be added as is consistent with the teachings herein.

According to the method in a first step 202, the consumer presents items for purchase to a merchant. As previously indicated, embodiments of the present invention encompasses transactions involving anything that can be sold and purchased. Thus, the term "items" is not intended to be limited to tangible goods.

In step 204, the merchant determines a price, or purchase amount, for the items. This can be accomplished by any suitable method using any suitable device(s). For example, in the case of a brick-and-mortar merchant, a cashier may scan bar codes affixed to the items. The scanner reads the bar codes, which include price information, and transmits the price information to an electronic cash register.

In step 206, the consumer presents a card for payment. As previously indicated, the card may be any type of monetary card suitable for making purchases. In step 208, information from the card is accessed by a card interface device. The card interface device encompasses any suitable hardware/software, such as a POS card reader. A card interface device may also include any computer, such as that included in an electronic cash register, which receives manual or verbal input of information associated with the card and/or the cardholder's account.

In step 210, an authorization request is sent from the merchant to an acquirer bank. The acquirer bank is a bank or other financial institution, which manages one or more financial accounts for the merchant. As used herein, the term information can include any information relevant to the transaction. The information may be in the form of electronic data, verbal information, or any other suitable form that may be communicated from one entity to another entity. The information may be transmitted over any suitable communications network according to any communications protocol.

In step 212, the authorization request is forwarded to a card issuer. The term "card issuer" can include any financial institution. As an example, in this embodiment, the "card issuer" is a company that issues the card. For example, the card may be a VISA™ card and the card issuer may be, for example, Capital One™. Preferably, the "card issuer" is the financial institution which manages the consumer account.

In step 214, the card issuer determines whether the consumer's card is registered for a rebate program. This step may be performed by any suitable method. For example, one or more processors within a card issuer's management system may compare certain information accessed from the card and forwarded as part of the authorization to an index indicating various consumers who are registered for a rebate program. The term "rebate program" is intended to cover any method of providing a rebate to a consumer consistent with the teachings herein.

In step 216, the card issuer determines whether the pending transaction meets one or more rebate criteria. This step may be performed separately from, or together with, step 214. That is, whether the card is registered may be one of the rebate criteria. Other rebate criteria can include any criteria associated with the transaction and/or the consumer account which may trigger the act of providing the consumer with a rebate. For example, rebate criteria may include the transaction amount. Rebate criteria may also include a predetermined total charge amount (which may encompasses the total of a plurality of charges made using the card). Rebate criteria may include a credit limit, a credit score, a security code, a fraud indicator, an amount payoff amount, a minimum payment due amount, a billing cycle, or another predetermined period of time. Rebate criteria may include a threshold amount or a predetermined purchase frequency or the location of the consumer and/or the merchant. The criteria may include any one of these or other criteria, or any combination thereof.

As one example, a rebate instruction may be generated at the moment that a consumer's pending purchase, totaled with prior transaction amounts using the card, equals a threshold amount (e.g., $2,000). As another example, a rebate instruction may be generated if the consumer's pending purchase is the Nth purchase within a certain predetermined period of time (e.g., the 10th purchase in a month, or the 3rd consecutive month that the consumer has made 5 purchases). As another example, the rebate may be triggered when the consumer is at a particular location or transacting with a particular merchant. The card issuer, for instance may have a relationship with certain vendors (such as affinity programs). The rebate may be initiated when the consumer is making purchases from one of these particular merchants. As another example, the rebate may be triggered if the purchase is being made at a particular time of day. For instance, the rebate may be triggered if the consumer is making a dinner purchase between certain hours of the day. As another example, the rebate may be triggered by the type of goods or services being purchased. For example, the consumer may establish a particular type of program according to which the consumer receives rebates for certain types of goods. For instance, the consumer might be registered for an automotive program, according to which the consumer receives rebates for purchases from automotive stores. As another example, the consumer may receive a rebate for simply using the card (e.g., being registered as a rebate card consumer). According to another example, the "rebate instruction" might not actually include an instruction to provide a rebate. Rather the instruction may be to notify the consumer that the consumer will receive a rebate in the future if one or more criteria are met. For instance, in the case of a threshold rebate criteria, and where the consumer's total purchases are at amount of $200 less the than the threshold amount, the instruction might be to notify the consumer that the consumer will receive a rebate when the consumer makes an additional $200 worth of purchases. As should be apparent, there are myriad ways that a rebate may be initiated.

If the consumer is not registered, and/or if the rebate criteria are not met, the transaction is completed in a normal fashion without a rebate in step 215.

In step 218, if the card is registered, and if the pending transaction meets the rebate criteria, then a rebate message is generated. For example, the card issuer system may generate a rebate message containing an instruction to the merchant to reduce the transaction price. This step may be accomplished by sending the instruction in any suitable format to the merchant via any communication network. For example, the instruction may be forwarded via the same network across which the authorization request was transmitted. Optionally, the instruction may be forwarded by way of a different communication path. The instruction may be in any format including electronic data or verbal instructions. In at least one embodiment the instruction is in the form of a transaction code. The transaction code is associated with a particular instructions, such as approved, rejected, or some special instruction. Preferably, the instruction includes an indication of the rebated amount and/or the method for determining the rebate amount. For example, the rebate may be a fixed amount for purchases over a certain dollar amount. The rebate may be a percentage of the pending transaction amount. In any event, the instruction provides the merchant with information necessary to execute the appropriate rebate. Preferably, the transaction code(s) is converted by at least one of the components at the merchant location so that an associated textual instruction is displayed to the merchant and/or the consumer.

In step 220, the merchant receives the instruction and executes the rebate. The rebate may be executed in a number of different ways. According to one embodiment, the transaction amount is reduced by the rebate amount. According to an alternative, the transaction amount is reduced by a certain percentage. According to another method, the transaction amount remains the same, but the consumer's account is charged the transaction amount less the rebate amount. In such a case, the authorization request is presented for the full transaction amount.

In step 222, the merchant settles with the card issuer. In cases where the transaction amount is reduced, the card issuer may conduct an electronic transfer of funds to the merchant's bank sufficient to cover cumulated rebate amounts. In the case where the transaction price was unchanged, the card issuer merely transfers transaction amounts according to the standard arrangement with the merchant's bank The card issuer only charges the consumer's account for the transaction amount less the rebate. Then the consumer pays the card issuer the reduced amount.

FIG. 3 illustrates another example method 300 of providing a rebate to a consumer. Certain steps illustrated in FIG. 3 and described herein may be accomplished in accordance with various alternative aspects discussed in connection with FIG. 2. For the sake of convenience, where the steps of method 300 can benefit from alternative aspects similar to those discussed in connection with method 200, the details of those alternative aspects are not repeated.

Method 300 begins with step 302, in which the consumer presents items for purchase to a merchant. In step 304, the merchant determines a price for the items. In step 306, the consumer presents a card for payment. In step 308, information from the card is accessed by a card interface device. In step 310, an authorization request is sent from the merchant to an acquirer bank. In step 312, the authorization request is forwarded to a card issuer. In step 314, the card issuer determines whether the consumer's card is registered for a rebate program. In step 316, the card issuer determines whether the pending transaction meets one or more rebate criteria.

In step 318, if the card is registered, and if the pending transaction meets the rebate criteria, then the card issuer sends an instruction to the merchant to reduce the transaction price. The rebate may be made contemporaneously with the consumer transaction. According to an aspect particular to this embodiment, the rebate message includes an instruction to the merchant to provide the consumer with a rebate amount at the Point of Sale. For example, if the consumer is making a $100 purchase, and if the method of determining the rebate is amount is to calculate 1% of any purchase, then the message to the merchant would include an instruction to provide the consumer with $1 cash. The instruction can be delivered as an authorization for the sum of the purchase amount plus the rebate amount. Alternatively, the authorization can be for the purchase amount with an instruction for the merchant to provide the rebate. Later, the issuer will settle the rebate with the merchant. As an option to cash rebates the merchant may be instructed to provide the consumer with some other item having value. For instance, the merchant may be instructed to provide the consumer with store credit, merchandise, or a gift card.

The rebate amounts for this and other embodiments may be stored and maintained. A running total of the rebate amounts may be calculated and the rebate may be provided at predetermined intervals or when the running total reaches a certain amount. For instance, in the case of store credit, purchases at a particular merchant may generate "rebates," the amounts of which are maintained and stored. When the rebates total a certain amount (e.g., $50), the merchant may be given the instruction to provide the consumer with $50 store credit.

According to an aspect of certain embodiments, messages may be sent to the consumer containing information associated with the rebate program. The messages may be sent according to any suitable method. For example, the messages my be sent via automated telephone calls, email, or by way of text printed on the consumer's receipt or card account statement. The messages may include any information associated with the various rebate methods described herein. For example, the message may indicated the rebate that the merchant was supposed to have provided. Alternatively, the message may indicated the criteria yet to be reached in order for the consumer to receive a rebate. For instance, the message may indicate that the consumer will receive a rebate the next time the consumer uses the card to make a purchase or when the consumer makes $100 more worth of purchases using the card.

In step 320, the merchant receives the instruction and executes the rebate. In step 322, the merchant settles with the card issuer.

Although the present invention has been described in detail, it should be understood that various changes, substitutions, and alterations may be made without departing from the scope and spirit of the invention as defined by the claims. For example, certain embodiments of the present invention include cards, software, and hardware devices (such as card interface devices) operable to conduct the rebate functionality described herein.

The invention claimed is:

1. A system for providing a rebate to a consumer, comprising:
   memory for storing information associated with a consumer account;
   a processor electronically coupled to the memory and operable to:
      receive a purchase request including a purchase amount, wherein the purchase request is initiated by a debit card or credit card transaction;
      process at least a portion of the information stored in the memory associated with the consumer account together with the purchase amount;
      determine whether the consumer should receive a rebate based on one or more rebate criteria, the one or more rebate criteria comprising a determination of whether a purchase amount meets a predetermined minimum purchase amount and a determination of the location of the consumer;
      determine the rebate, using a predetermined method for determining a rebate amount, if the determination is made that the consumer should receive a rebate; and
      generate a rebate message, the rebate message including instructions to provide the consumer with the rebate if the determination is made that the consumer should receive a rebate and to complete the transaction without a rebate if the determination is made that the consumer should not receive a rebate,
   wherein the predetermined minimum purchase amount is an amount greater than zero and the rebate message is forwarded to a merchant and comprises an instruction to the merchant to reduce a purchase amount by a rebate amount, wherein the merchant receives an amount that is less than the purchase amount based on the rebate amount.

2. The system of claim 1, wherein the rebate is determined according to one or more rebate criteria.

3. The system of claim 2, wherein the rebate criteria comprises a determination that the consumer is registered for a rebate program.

4. The system of claim 2, wherein the rebate criteria comprises a determination of whether a plurality of purchases by the consumer totals more than a predetermined minimum purchase amount.

5. The system of claim 2, wherein the rebate criteria comprises a purchasing frequency.

6. The system of claim 2, wherein the rebate criteria comprises a determination of whether a certain time interval has passed.

7. The system of claim 2, wherein the rebate criteria comprises a transaction type.

8. The system of claim 1, wherein the rebate amount is a predetermined amount.

9. The system of claim 1, wherein the rebate amount is a percentage of the purchase amount.

10. The system of claim 1, wherein the rebate message comprises an instruction to a card issuer account management system to charge a consumer account a purchase amount reduced by a rebate amount.

11. A monetary debit card or credit card, comprising:
a card body; and
a memory device affixed to the card body, the memory device operable to store information associated with a consumer account,
wherein information from the memory device is used together with the purchase amount to determine whether the consumer should receive a rebate, the rebate comprising a reduction in the purchase amount,
wherein the determination of whether a consumer should receive a rebate is performed according to one or more rebate criteria,
wherein the rebate criteria comprises a determination of whether a purchase amount meets a predetermined minimum purchase amount and a determination of the location of the consumer, and
wherein the rebate message is forwarded to a merchant and comprises an instruction to the merchant to reduce a purchase amount by a rebate amount, wherein the merchant receives an amount that is less than the purchase amount based on the rebate amount.

12. A computer readable medium comprising computer executable instructions operable to:
determine whether a consumer is registered for a rebate program;
receive a purchase request including a purchase amount, wherein the purchase request is initiated by a debit card or credit card transaction;
determine a rebate amount in accordance with one or more rebate criteria; and
generate a rebate message, the rebate message comprising an instruction to reduce the purchase amount by the rebate amount,
wherein the rebate criteria comprises a determination of whether the purchase amount meets a predetermined minimum purchase amount and a determination of the location of the consumer, and wherein the rebate message is forwarded to a merchant and comprises an instruction to the merchant to reduce a purchase amount by a rebate amount, wherein the merchant receives an amount that is less than the purchase amount based on the rebate amount.

13. A system for administering a rebate comprising:
a debit or credit financial account, the account having a rebate feature, the rebate feature comprising a consumer's entitlement to a rebate if one or more rebate criteria are met, the rebate comprising a reduction of a purchase amount; and
a point of sale card reader indicates the rebate amount,
wherein the determination of whether a consumer should receive a rebate is performed according to one or more rebate criteria,
wherein the rebate criteria comprises a determination of whether a purchase amount meets a predetermined minimum purchase amount and a determination of the location of the consumer, wherein the rebate message is forwarded to a merchant and comprises an instruction to the merchant to reduce a purchase amount by a rebate amount, wherein the merchant receives an amount that is less than the purchase amount based on the rebate amount.

14. The rebate administration system of claim 13, wherein the reduction of the purchase amount comprises a point-of-sale reduction of a purchase amount.

15. The rebate administration system of claim 13, wherein the reduction of the purchase amount comprises a charge to a consumer credit account equal to the purchase amount less a rebate amount.

* * * * *